June 9, 1925.
C. P. LANCASTER
1,541,228
AUTOMATIC BRAKE
Filed Oct. 13, 1923
2 Sheets-Sheet 1
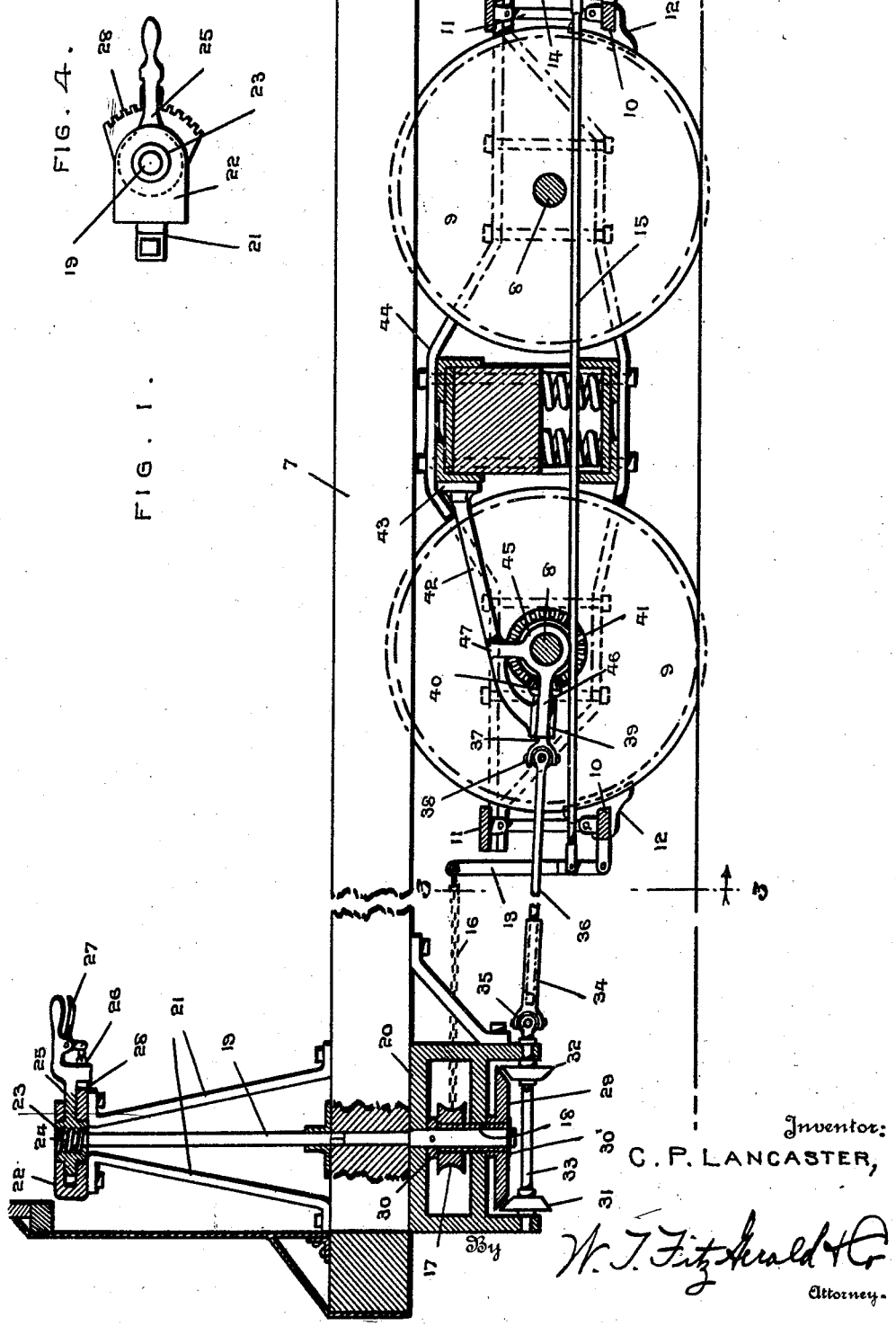
Inventor:
C. P. LANCASTER,
By W. J. Fitzgerald
Attorney.

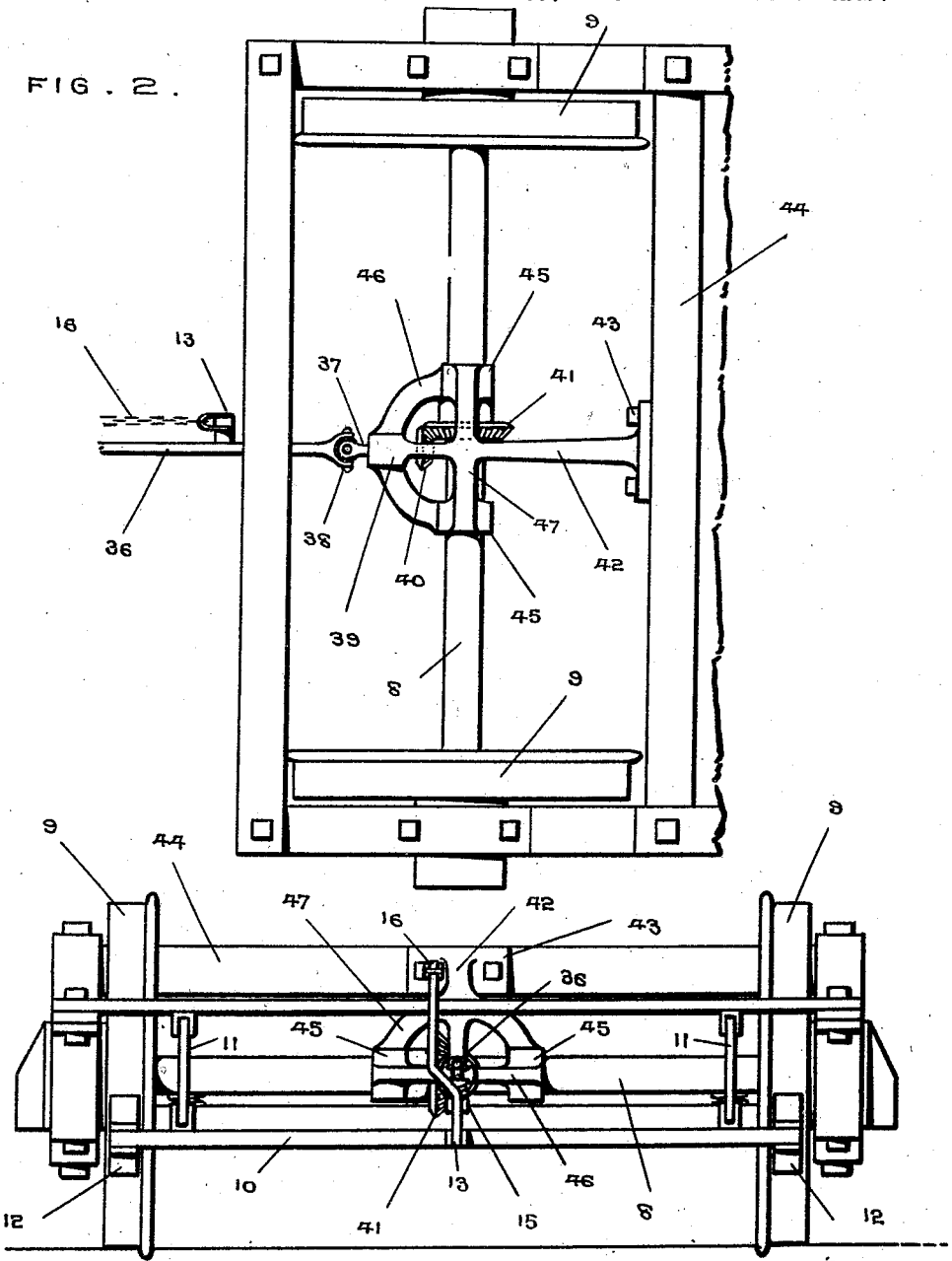

Patented June 9, 1925.

1,541,228

UNITED STATES PATENT OFFICE.

CHARLES P. LANCASTER, OF THREE RIVERS, MICHIGAN, ASSIGNOR OF ONE-HALF TO ESTER T. GRIFFIN, OF THREE RIVERS, MICHIGAN.

AUTOMATIC BRAKE.

Application filed October 13, 1923. Serial No. 668,328.

*To all whom it may concern:*

Be it known that I, CHARLES P. LANCASTER, a citizen of the United States, residing at Three Rivers, in the county of St. Joseph and State of Michigan, have invented certain new and useful Improvements in Automatic Brakes; and I do hereby declare the following to be a full, clear, and exact description of the invention, such as will enable others skilled in the art to which it appertains to make and use the same.

The present invention relates to vehicle brakes, such as used on railroad cars, street cars, and the like, and aims to provide a novel and improved automatic brake which is so operable that the rotation of the wheels of the vehicle will, at the will of the operator, operate means for applying the brake shoes to such wheels, to arrest or retard motion of the vehicle, so that manual or other power is unnecessary for stopping the vehicle or retarding its movement.

A further object is the provision of such a mechanism including means operated by the vehicle wheels, brake applying means, and means for operating the brake applying means from the means operated by the wheels, under the control of the operator whereby the operator by the simple movement of a handle can apply or release the brakes.

It is also the object of the invention to provide an automatic brake of the nature indicated which is comparatively simple and inexpensive in construction, which can be readily installed on various vehicles and which will operate efficiently and quickly in response to the movement of the controlling handle.

With the foregoing and other objects in view, which will be apparent as the description proceeds, the invention resides in the construction and arrangement of parts as hereinafter described and claimed, it being understood that changes can be made within the scope of what is claimed, without departing from the spirit of the invention.

The invention is illustrated in the accompanying drawings, wherein—

Figure 1 is a vertical section of the mechanism, portions being shown in elevation.

Fig. 2 is a plan view of that part of the mechanism assembled with the vehicle truck.

Fig. 3 is a section on the line 3—3 of Fig. 1.

Fig. 4 is a plan view of the control stand and lever.

In the drawings, 7 designates the body or deck of the car or vehicle, and 8 the axles of a truck carried by the wheels 9. Ordinary brake beams 10 are suspended by hangers 11 from the truck frame and have shoes 12 to bear against the wheels 9 in the usual way, for retarding the motion of the vehicle.

Various mechanisms are used for operating the brake beams 10 to force the shoes 12 against the wheels. As shown, the levers 13 and 14 are connected to the beams, the lever 14 being fulcrumed to the truck frame, and said levers being connected by a rod or link 15. The lever 13 is operated for applying and releasing the brakes.

In carrying out the invention, a chain or other flexible element 16 is attached to the lever 13 and extends to and is wound upon a drum 17 secured on a sleeve 18 fitted on the lower terminal of a vertical shaft or rod 19 which is mounted for vertical sliding movement within a hanger frame 20 secured to and depending from the vehicle body or deck 7. This frame 20 has an opening in which the drum 17 is disposed and the shaft 19 is of square or non-circular cross section so that it is prevented from turning.

The shaft 19 extends through the body 7, and its upper portion is located within a stand mounted on the vehicle body. The stand comprises the legs 21 secured on the body 7 and a head 22 secured on said legs. A nut 23 is swivelled within the head, and the upper terminal of the shaft 19 has the screw-threads 24 engaging within the nut 23, whereby the turning movement of the nut 23 will raise and lower the shaft 19, thus providing the controlling means for the brake mechanism. The nut 23 has a lever or handle 25 extending therefrom for convenience in turning the nut, and said lever 25 carries a dog or pawl 26 operated by a lever 27, one edge of the head 22 having notches or teeth 28 for the engagement of the dog 26 to hold the nut 23 in different angular positions.

A bevelled friction wheel 29 is secured on the lower end of the sleeve 18, whereby said wheel turns with the drum 17, and the sleeve 18 is mounted for rotation in the frame 20. A collar 30 is secured on the shaft 19 and bears on the sleeve 18 and drum 17 to force the wheel 29 down with the shaft 19, and a washer 30′ is secured to the lower end of the shaft 19 to raise the wheel 29 with the shaft. The sleeve 18 which carries the drum 17 and friction wheel 29 is thus swivelled on the lower terminal of the shaft or rod 19 and is raised and lowered with said shaft. The drum and wheel can rotate around the shaft 19 which is non-rotatable, and the upward and downward movement of the shaft 19 is used for releasing and applying the brakes, respectively.

The means operated by one pair of wheels, for applying the brakes, includes a horizontal shaft 33 journaled in the frame 20 below the friction wheel 29, and bevelled friction wheels 31 and 32 are mounted on said shaft 33 within the frame 20 at the opposite sides of the wheel 29. The wheel 32 is secured rigidly on the shaft 33, while the wheel 31 is loose thereon and serves as an idler so that the wheel 29 will bear with equal pressure on the wheels 31 and 32 when the shaft 19 is moved downwardly to depress the wheel 29 against the wheels 31 and 32.

The shaft 33 is operatively connected with one axle 8, and the operative connection includes a shaft section 34 having a universal joint 35 with the shaft 33, and a second shaft section 36 having a sliding or telescopic connection with the shaft section 34. The shaft section 36 has a universal joint 38 connecting it with a drive shaft 37 which is journaled in a bearing 39. A bevelled gear wheel 40 is secured on the shaft 37 and meshes with a bevelled gear wheel 41 secured on the axle 8 to which the shaft extends, whereby the shaft 33 is driven from such axle when the vehicle is in motion.

The bearing 39 is carried by the end of a brace or bracket 42 extending over the corresponding axle 8 and attached, as at 43, to the frame 44 of the truck. Sleeves 45 are disposed loosely on the axle at the opposite sides of the gear wheel 41 and are connected by yokes 46 and 47, the bearing 39 being a part of the yoke 46, and the yoke 47 being integral with the brace or bracket 42. The bearing 39 is thus carried in a substantial manner for supporting the shaft 37 and gear wheel 40.

The universal joints 35 and 38 permit, in connection with the sliding connection of the shaft sections 34 and 36, the relative movements of the vehicle body and truck, due to the vertical motion of the vehicle body, and the turning movement of the truck when passing around curves. The operative connection between the shaft 33 and corresponding axle 8 is therefore flexible so that the body and truck can move in different directions relatively to one another without interfering with the operation of the brake mechanism.

When the vehicle is in motion, the rotation of the corresponding axle 8 will be imparted to the shaft 33 and wheel 32. To apply the brakes, the operator simply moves the handle or lever 25 in the proper direction so that the nut 23 will force the shaft 19 downwardly, thereby pressing the friction wheel 29 down tightly on the friction wheels 31 and 32. As a result the friction wheel 29 and drum 17 will be rotated from the axle, thereby winding the cable 16 on the drum and swinging the lever 13 to force the brake shoes 12 against the wheels 9, so as to retard the motion of the vehicle. The motion of the vehicle is thus utilized to furnish the power for applying the brakes, so that the vehicle in fact checks its own motion, without requiring manual effort to apply the brakes, excepting the easy movement of the handle or lever 25, and also eliminating complicated pneumatic or other means for actuating the brakes. The greater the motion and momentum of the vehicle, the greater will be the force applied to the brakes, and the contacting friction wheels can slip after the brake shoes are moved tightly against the wheels. The operator can also control the application of the brakes, by oscillating the handle 25 to connect and disconnect the drum 29 with reference to the actuating means, so that the usual "service" and "emergency" applications of the brakes can be obtained. When the handle 25 is swung to raise the shaft 19, the friction wheel 29 is lifted off of the wheels 31 and 32, thereby disconnecting the drum 17 from the actuating means, and permitting the cable 16 to unwind from the drum owing to the tension of the cable and other parts so that the brakes will be released.

Having thus described the invention, what is claimed as new is:—

1. The combination in a vehicle, of a wheel, brake means for retarding the motion of said wheel, a frame, a vertical shaft slidable vertically in said frame and prevented from turning, a sleeve rotatable in said frame and on said shaft and movable vertically with said shaft, a friction wheel rotatable about a horizontal axis simultaneously with the rotation of the first named wheel, a friction wheel carried by said sleeve to bear on the aforesaid friction wheel, a drum on said sleeve, a flexible element to be wound on the drum and connected to the brake means for applying it, a stand, a nut mounted for turning movement in the stand and screw-threaded on said shaft, and a handle connected to said nut.

2. The combination in a vehicle, of a truck having a frame and wheels, a vehicle body mounted on said truck, a depending frame secured to the body, a bracket secured to the truck frame and having spaced sleeves on one axle of the truck, the bracket having an arch connecting said sleeves and a bearing, a shaft journaled in said depending frame, a shaft journaled in said bearing, a flexible connection between said shafts, gears connecting the last named shaft and axle within said arch, a friction wheel on the first named shaft, a friction wheel mounted in said depending frame for vertical movement and adapted to bear on the aforesaid friction wheel, brake means for retarding the rotation of the first named wheels, and operatively connected with the last named friction wheel, and means for raising and lowering the last named friction wheel.

In testimony whereof I have signed my name to this specification in the presence of two subscribing witnesses.

CHARLES P. LANCASTER.

Witnesses:
MURL FLETCHER,
C. R. FLETCHER.